Patented July 5, 1949

2,475,133

UNITED STATES PATENT OFFICE 2,475,133

FORTIFYING GRAIN PRODUCTS

Max Frank Furter, Montclair, and Werner M. Lauter, Glen Rock, N. J., assignors to Hoffmann-La Roche Inc., Nutley, N. J., a corporation of New Jersey No Drawing. Application July 8, 1947, Serial No. 759,694

7 Claims. (Cl. 99—11)

The present invention relates to the fortification of grain products and more particularly to the fortification of cereal grains with vitamins. The invention is particularly concerned with the fortification of those grains which are subjected, prior to consumption, to dehulling and other treatments, such as washing, cooking, and the like, which result in the loss of the vitamin, mineral, protein and fat content of the natural whole grain. Our invention relates to the improvement of the nutritional value of grain products. One particular aspect of our invention relates to the vitaminization of dehulled rice, and another to the vitaminization of corn. The grains can be treated whole or in the form of granulations, such as grits.

Rice and corn grits are generally washed prior to use. Rice is also dehulled in order to produce the white rice of commerce. Both the dehulling and washing of these grains removes the major part of the naturally-present vitamins and minerals. Accordingly, various proposals have been made to fortify such cereal grains with vitamins and minerals. Among such proposals are those described in Furter Patents Nos. 2,381,342 and 2,381,343 granted August 7, 1945. In Patent Number 2,381,342 the vitamin component is restored to the hulled rice by applying to the stripped rice grains a coating of a film-forming, water-soluble substance, having the vitamins incorporated therein. There is disclosed for this purpose the aqueous dextrin-glucose syrup customarily employed for polishing rice, as the carrier for the vitamins. In Patent Number 2,381,343 the vitamins are deposited on the grains by treatment with an aqueous solution of the vitamin, stirring until frictional heat dries the solvent, this being followed by the polishing of vitaminized product with the dextrin-glucose on the grains.

Our invention is primarily concerned with the production of fortified grain and grain premixes. A premix contains all the vitamin and/or mineral additions added to a small portion of the grain product to be enriched. For example, rice premix as prepared by our invention may contain 200 times the amount of vitamins and minerals normally present in whole rice. By diluting one part of this rice premix by mixing with 199 parts of polished rice, there are obtained 200 parts of so-called enriched rice. Likewise, a corn grits premix, because the particles are much smaller than rice, can be so prepared by our invention that on mixing one part of the premix with 799 parts of ordinary corn grits, 800 parts of enriched corn grits are obtained. It will thus be seen that the expense is reduced to a fraction ($1/200$ to $1/800$) of the cost of enriching grains in toto, by using premixes. Furthermore, no separation of the premix grains in the enriched grain product during packing, transportation and storage occurs. Such premixes as are obtained by our invention, because of their stability to storage losses, heat, washing and cooking provide, after the enriched rice has been washed and cooked, thiamin, niacin and iron and/or other vitamins and minerals in any nutritionally desirable amounts, for example, equal to that in enriched flour.

Loss in washing and/or cooking constitutes the chief difficulty in the retention of the fortifying agents in enriched rice. A feature of the premixes obtained according to our invention is the retention of the fortifying agents on the treated rice. As a result, the well-known and practically entire loss of the vitamins and minerals in the nonenriched rice upon washing is completely compensated for in rice enriched with premix because the latter retains the fortifying agents. Furthermore, the added nutrients are completely available from the rice after normal cooking.

Another feature of our invention is the application of the vitamin fortifying agent in acidic aqueous solution, the acid being preferably a mineral acid such as sulfuric or phosphoric acid. Riboflavin and niacin become especially suitable for fortifying grains when employed in such acidic solutions because of their increased solubility in such solutions. In the case of niacin, the acidity may be supplied by employing the niacin in the form of niacin sulfate. In this form the niacin is more soluble in water. Furthermore, the acid solution permits penetration of the vitamins throughout the grain and converts at least a part of the starches present into starch esters and sugars.

After the vitamin solution has been applied to the cereal grains, they are coated with an edible coating which comprises a film-forming agent, an agent which imparts adhesiveness to the film-forming agent, and a plasticizer. A preferred coating for this purpose comprises a corn protein or prolamine such as zein as a film-forming ingredient, abietic acid to impart adhesiveness, and a higher fatty acid, such as palmitic acid or stearic acid as a plasticizing agent. As a solvent, ethanol or isopropanol can be employed. Isopropanol is the preferred solvent since it does not have any dissolving action on the vitamins with which the grains have been treated. The components of the protective coating do not interfere with the physiological availability of the vitamins in the enriched grain.

A feature of our novel coating is that it is insoluble and repellant to tap water or slightly warm water as is normally employed in the washing operation, but is removable by water at temperatures normally employed for cooking, so that it is removed from the grain on cooking and the vitamins are released from the premixed grains and uniformly distributed to the previously non-enriched grains during the cooking thereof. Furthermore, the coating is such that it does not flake off from the grain surfaces during mixing and other operations.

More particularly, the coating which we employ is insoluble or substantially insoluble in cold water, that is, water below about 55° C., readily removed by water above about 70° C., nontoxic, not attacked by enzymatic action, nor made rancid by oxygen, substantially free from color and odor, easily soluble in solvents which will not remove the vitamins applied to the grains, readily adheres to the grains, possesses plasticity even at temperatures of −10° C. and is non-sticky at temperatures up to 40° C.

The process for preparing the grain premixes according to our invention can be carried out in any suitable equipment. A feature of our invention is that the trumbol or rotary drum used in the rice mill for coating or mixing rice after polishing may be employed, or a pony mixer provided with rubber-coated mixing blades. In general, the process involves adding the solution of the vitamins to the grains while stirring or mixing. The vitamin solution may be applied as a spray onto the grains as they are being stirred. After the final portion of the solution has been added, preheated air is blown over the grains until they are thoroughly dry. A portion of the coating solution of zein, abietic acid, palmitic acid and alcohol is then sprayed onto the grain while the latter is stirred. After thorough mixing during which the solvent is evaporated, a mineral-fortifying agent such as iron pyrophosphate or ferrous sulfate in talc (to prevent lumping of the iron salt) may be applied to the coated grains. The remainder of the coating solution is then applied, and the coated grains may, if desired, be finally mixed with talc to effect smoothness, impart whiteness to the coating and prevent "balling." The grains are screened and the premix can then be mixed with untreated and non-enriched grains to give enriched grains as explained above.

The following examples will serve to illustrate our invention:

*Example 1*

An acidic solution of niacin and vitamin $B_1$ is prepared as follows: To 225 fluid oz. of distilled water there are added 134.5 oz. by weight of concentrated sulfuric acid and 282.2 oz. by weight of niacin in small portions. The mixture is stirred vigorously during the addition of the ingredients, the niacin being added in amounts of 16 oz. at a time. When the solution has become clear, there is rapidly added 1.375 kg. of vitamin $B_1$. After clear solution is attained, 30.5 fluid oz. of a tackifier and drying retarder such as corn syrup, or converted or semi-converted sugars such as fructose, dextrose, or sorbitol are added. The tackifier and drying retarder assists in the adherence of the vitamins to the grain and prevents too rapid drying of the vitamin solution before it has penetrated the grains. While advantageous for this purpose, the tackifier and retarder may be omitted, if desired, and the rate of drying, after application of the vitamin solution, controlled so as to prevent too rapid drying.

The above solution is sprayed onto 2,194 pounds of polished, uncoated white rice with stirring in a trumbol for about 42 minutes. To dry the rice, warm air of about 60° C. is blown over the rice for about 1 hour while the latter is stirred.

The vitaminized rice is now mixed with 88 oz. by weight of talc until the talc is evenly distributed over the rice.

A coating is prepared as follows:

(a) To 98.7 oz. by weight of molten palmitic acid are added 381 oz. of abietic acid, and the mixture heated until the abietic acid is dissolved in the palmitic acid.

(b) 954.5 fluid oz. of isopropanol and 61 fluid oz. of tap water are mixed together and warmed to about 60° C. 324.5 oz. by weight of zein are added and stirred until dissolved.

Molten mixture (a) is then added slowly to solution (b) and the resulting solution is kept just below the boiling point while adding half its volume to the vitaminized rice, the rice being stirred during the addition. A finely powdered and thoroughly mixed mixture of 932 oz. by weight of iron-pyrophosphate and 1322 oz. of talc which prevents the iron-pyrophosphate from forming lumps is now added evenly to the rice while being mixed. As soon as the rice has become dry, which takes usually about one hour, the remainder of the coating solution is added to the rice while stirring. After about ten minutes, 2131 oz. of talc are added and the stirring of the rice is continued for about 15 minutes. The treated rice is dried for about 1½ hours and then screened. In this manner vitaminized rice premix is obtained which may be mixed with polished rice to form enriched rice. The premix rice is stable to storage and substantially retains the added vitamins on washing and cooking. One ounce of the rice premix is sufficient to enrich 199 oz. of dehulled rice.

*Example 2*

A vitamin solution containing the following ingredients is prepared in the same manner as in Example 1.

| | | |
|---|---|---|
| Vitamin $B_1$ | grams | 598 |
| Niacin | do | 5880 |
| Concentrated sulfuric acid | do | 2804 |
| Water | cc | 9171 |
| Corn syrup as a tackifier and retarder | cc | 756 |

This solution is mixed with 310 pounds of 40 mesh corn grits. The thus vitaminized corn grits are coated in three steps with a coating solution prepared in the same manner as in Example 1, but containing the following proportions of ingredients:

| | | |
|---|---|---|
| Zein | ounces | 333.5 |
| Abietic acid | do | 240.0 |
| Palmitic acid | do | 85⅓ |
| Isopropanol | cc | 57,333 |
| Water | cc | 2,225 |

While stirring the vitaminized rice, about 37.5 per cent of the coating is applied followed by a powder mixture of 47 lbs. of iron-pyrophosphate and 32 lbs. of talc. After drying, another 37.5 per cent of the coating is applied followed by 50 lbs. of talc. Then the remainder of the coating is applied followed by 12 lbs. of talc. The vitaminized and coated corn grits are screened. One ounce of this premix is sufficient to enrich 50 lbs. of ordinary corn grits by simply mixing it with the latter.

*Example 3*

A vitamin solution containing the following ingredients is prepared as in Example 1:

| | | |
|---|---|---|
| Water | cc | 480.0 |
| Sulfuric acid | grams | 151 |
| Niacin | do | 295.7 |
| Vitamin $B_1$ | do | 38.7 |
| Corn syrup as a tackifier and retarder | cc | 31 |

The solution is mixed with 6,000 grams of corn grits between 10 and 40 mesh screen in a pony mixer equipped with rubber-coated blades. The grits are dried with warm air.

The coating solution containing the following ingredients is prepared in the same manner as in Example 1:

| | | |
|---|---|---|
| Zein | grams | 506 |
| Abietic acid | do | 371.7 |
| Palmitic acid | do | 132.5 |
| Isopropanol | cc | 2875 |
| Water | cc | 90 |

25 per cent of the above coating solution is added to the dried rice while mixing, followed by a powdered mixture of 1030 grams of iron pyrophosphate and 23.2 grams of vitamin $B_2$.

After drying for one hour, another 25 per cent of the coating solution is added, followed by 500 grams of talcum. After 1 hour's drying, another 25 per cent of the solution followed by 500 grams of talcum are added. After drying for 2 hours, the last 25 per cent of the coating solution is added. When the material has become nearly dry, 100 grams of talcum are added. Each ounce of the premix thus obtained will enrich 50 lbs. of ordinary corn grits. It is highly stable on storage and retains the added vitamins and mineral ingredients on washing.

It is to be understood that the above examples are illustrative and that the cereal grains may be enriched with other vitamins and minerals and that other grains can be fortified in the same manner. It is also to be understood that by the expression "grains," we include whole grains as well as granulations thereof, such as grits.

We claim:

1. A method of fortifying grain with a water-soluble vitamin which comprises applying said vitamin to said grain and coating said fortified grain with a non-toxic coating comprising a prolamine, a saturated higher fatty acid, and abietic acid.

2. A method of fortifying rice with a water-soluble vitamin which comprises applying said vitamin to said rice and coating said fortified rice with a non-toxic coating comprising a prolamine, a saturated higher fatty acid, and abietic acid.

3. A method of fortifying corn grits with a water-soluble vitamin which comprises applying said vitamin to said corn grits and coating said fortified corn grits with a non-toxic coating comprising a prolamine, a saturated higher fatty acid, and abietic acid.

4. A method of fortifying grain with a water-soluble vitamin which comprises applying said vitamin to said grain and coating said fortified grain with a non-toxic coating comprising zein, palmitic acid and abietic acid.

5. A method of fortifying rice with a water-soluble vitamin which comprises applying said vitamin to said rice and coating said fortified rice with a non-toxic coating comprising zein, palmitic acid and abietic acid.

6. Grain fortified with a water-soluble vitamin and coated with a non-toxic coating comprising a prolamine, a saturated higher fatty acid, and abietic acid.

7. Rice fortified with a water-soluble vitamin and coated with a non-toxic coating comprising zein, palmitic acid and abietic acid.

MAX FRANK FURTER.
WERNER M. LAUTER.

REFERENCES CITED

The following references are of record in the file of this patent:

UNITED STATES PATENTS

| Number | Name | Date |
|---|---|---|
| 874,310 | Donard et al. | Dec. 17, 1907 |
| 2,128,973 | Tisdale et al. | Sept. 6, 1938 |
| 2,218,592 | Taylor | Oct. 22, 1940 |
| 2,275,565 | Sherwood et al. | Mar. 10, 1942 |
| 2,284,804 | De Angelis | June 2, 1942 |
| 2,381,343 | Furter | Aug. 7, 1945 |
| 2,390,210 | Fieger et al. | Dec. 4, 1945 |

OTHER REFERENCES

"The Condensed Chemical Dictionary" (third edition), Reinhold Publishing Corporation, 330 W. Forty-second Street, New York, page 681.